(12) United States Patent
Yun et al.

(10) Patent No.: US 12,327,841 B2
(45) Date of Patent: Jun. 10, 2025

(54) ELECTRODE ASSEMBLY AND METHOD FOR MANUFACTURING THE SAME

(71) Applicant: LG Energy Solution, Ltd., Seoul (KR)

(72) Inventors: Su Hyun Yun, Daejeon (KR); Bum Young Jung, Daejeon (KR); Kyung Min Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 486 days.

(21) Appl. No.: 17/774,962

(22) PCT Filed: Aug. 27, 2020

(86) PCT No.: PCT/KR2020/011465
§ 371 (c)(1),
(2) Date: May 6, 2022

(87) PCT Pub. No.: WO2021/101026
PCT Pub. Date: May 27, 2021

(65) Prior Publication Data
US 2022/0393246 A1    Dec. 8, 2022

(30) Foreign Application Priority Data
Nov. 19, 2019    (KR) .................... 10-2019-0148934

(51) Int. Cl.
*H01M 50/54*    (2021.01)
*H01M 4/66*    (2006.01)
(Continued)

(52) U.S. Cl.
CPC ....... *H01M 10/0585* (2013.01); *H01M 4/661* (2013.01); *H01M 10/0569* (2013.01); *H01M 50/533* (2021.01); *H01M 50/54* (2021.01)

(58) Field of Classification Search
CPC ........ H01M 4/66; H01M 4/661; H01M 4/667; H01M 4/668; H01M 50/54
See application file for complete search history.

(56) References Cited

U.S. PATENT DOCUMENTS 6,423,446 B1    7/2002    Miyazaki et al.
10,096,433 B1    10/2018    Shin et al.
(Continued)

FOREIGN PATENT DOCUMENTS

CN    104904053 A    9/2015
CN    108428848 A    8/2018
(Continued)

OTHER PUBLICATIONS

Clarivate Analytics machine translation of JP 2012-155974 A (Year: 2012).*
(Continued)

*Primary Examiner* — Kevin E Yoon
(74) *Attorney, Agent, or Firm* — Lerner David LLP

(57) ABSTRACT

A method for manufacturing an electrode assembly according to an embodiment of the present invention may include applying a positive electrode active material to at least a portion of a positive electrode collector, applying a negative electrode active material to at least a portion of a negative electrode collector, The method may include interposing a separator between a positive electrode and a negative electrode, and respectively removing a positive electrode insulating layer and a negative electrode insulating layer from at least partial areas of a positive electrode tab, which is not coated with the positive electrode active material, and an negative electrode tab, which is not coated with the negative electrode active material in the negative electrode collector. The method may include connecting a positive electrode lead and a negative electrode lead to the positive electrode tab and the negative electrode tab, respectively.

8 Claims, 9 Drawing Sheets

(51) Int. Cl.
*H01M 10/0569* (2010.01)
*H01M 10/0585* (2010.01)
*H01M 50/533* (2021.01)

(56) References Cited

U.S. PATENT DOCUMENTS

| | | | |
|---|---|---|---|
| 2009/0017376 A1* | 1/2009 | Yamamura | H01M 4/668 |
| | | | 429/209 |
| 2015/0147629 A1 | 5/2015 | Kim et al. | |
| 2016/0329547 A1 | 11/2016 | Jin et al. | |
| 2019/0157656 A1 | 5/2019 | Li et al. | |
| 2019/0157684 A1 | 5/2019 | Xing et al. | |
| 2019/0173088 A1 | 6/2019 | Liang et al. | |
| 2019/0341622 A1 | 11/2019 | Liang et al. | |
| 2020/0203733 A1 | 6/2020 | Xing et al. | |
| 2020/0343558 A1 | 10/2020 | Liang et al. | |

FOREIGN PATENT DOCUMENTS

| | | | |
|---|---|---|---|
| JP | H09120818 A | | 5/1997 |
| JP | H09213338 A | | 8/1997 |
| JP | H109283149 A | | 10/1997 |
| JP | 2003282064 A | * | 10/2003 |
| JP | 2005268038 A | | 9/2005 |
| JP | 2007083288 A | | 4/2007 |
| JP | 2008041511 A | | 2/2008 |
| JP | 2009043515 A | | 2/2009 |
| JP | 2010205507 A | | 9/2010 |
| JP | 4588358 B2 | | 12/2010 |
| JP | 4643780 B2 | | 3/2011 |
| JP | 2012155974 A | | 8/2012 |
| JP | 2012169085 A | | 9/2012 |
| JP | 2014135169 A | | 7/2014 |
| JP | 2017123278 A | | 7/2017 |
| JP | 6514385 B1 | | 5/2019 |
| JP | 2019-096591 A | | 6/2019 |
| JP | 2019-102428 A | | 6/2019 |
| KR | 100310651 B1 | | 10/2001 |
| KR | 100591453 B1 | | 6/2006 |
| KR | 20160045033 A | | 4/2016 |

OTHER PUBLICATIONS

Clarivate Analytics machine translation of JP 2012-169085 A (Year: 2012).*
EPO machine translation of JP 2012-155974 A (Year: 2012).*
Extended European Search Report including Search Opinion from 20889471.7, dated Aug. 8, 2024, pp. 1-8.
International Search Report for Application No. PCT/KR2020/011465 dated Dec. 4, 2020, 2 pages.

* cited by examiner

ELECTRODE ASSEMBLY AND METHOD FOR MANUFACTURING THE SAME

CROSS-REFERENCE TO RELATED APPLICATION

The present application is a national phase entry under 35 U.S.C. § 371 of International Application No. PCT/KR2020/011465 filed on Aug. 27, 2020, which claims the benefit of the priority of Korean Patent Application No. 10-2019-0148934, filed on Nov. 19, 2019, all of which are hereby incorporated by reference herein in their entirety.

TECHNICAL FIELD

The present invention relates to an electrode assembly and a method of manufacturing the same, and more particularly, to an electrode assembly which is formed in a multilayered structure including an electrode insulating layer and capable of easily connecting one electrode lead to a plurality of electrode tabs without a separate connection part, and a method for manufacturing the same.

BACKGROUND ART

In general, secondary batteries include nickel-cadmium batteries, nickel-hydrogen batteries, lithium ion batteries, and lithium ion polymer batteries. Secondary battery are being used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture an electrode assembly, a cathode (hereinafter, referred to as a positive electrode), a separator, and an anode (hereinafter, referred to as a negative electrode) are manufactured and stacked. Specifically, positive electrode active material slurry is applied to a positive electrode collector, and negative electrode active material slurry is applied to a negative electrode collector to manufacture a positive electrode and a negative electrode. Also, when the separator is interposed and stacked between the manufactured positive electrode and the manufactured negative electrode, unit cells are formed. The unit cells are stacked on each other to form an electrode assembly. Also, when the electrode assembly is accommodated in a specific case, and an electrolyte is injected, the secondary battery is manufactured.

However, according to the related art, the electrodes such as the positive electrode and the negative electrode are formed in a single-layered structure so that electricity flows between both surfaces of the electrode. Accordingly, when the electrode assembly is damaged due to an external impact, a short circuit occurs on one surface of the electrode, and also, the short circuit occurs on the other surface of the electrode to cause a risk of explosion or the like.

DISCLOSURE OF THE INVENTION

Technical Problem

An object of the present invention for solving the above problems is to provide an electrode assembly which is formed in a multilayered structure including an electrode insulating layer and capable of easily connecting one electrode lead to a plurality of electrode tabs without a separate connection part, and a method for manufacturing the same.

The objects of the present invention are not limited to the aforementioned object, but other objects not described herein will be clearly understood by those skilled in the art from descriptions below.

Technical Solution

A method for manufacturing an electrode assembly according to an embodiment of the present invention for solving the above problems includes: a step of applying a positive electrode active material to at least a portion of a positive electrode collector, which is formed by sequentially stacking a first positive electrode foil, a positive electrode insulating layer, and a second positive electrode foil, to manufacture a positive electrode and applying a negative electrode active material to at least a portion of a negative electrode collector, which is formed by sequentially stacking a first negative electrode foil, a negative electrode insulating layer, and a second negative electrode foil, to manufacture a negative electrode; a step of interposing a separator between the positive electrode and the negative electrode; a step of respectively removing the positive electrode insulating layer and the negative electrode insulating layer from at least partial areas of a positive electrode tab, which is not coated with the positive electrode active material in the positive electrode collector, and an negative electrode tab, which is not coated with the negative electrode active material in the negative electrode collector; and a step of connecting a positive electrode lead and a negative electrode lead to the positive electrode tab and the negative electrode tab, respectively.

Also, the step of removing the positive electrode insulating layer and the negative electrode insulating layer may include a step of immersing the positive electrode tab and the negative electrode tab in an organic solvent.

Also, each of the positive electrode insulating layer and the negative electrode insulating layer may include polyethylene terephthalate (PET).

Also, the organic solvent may include acetone.

Also, each of the positive electrode tab and the negative electrode tab may be immersed in the organic solvent by 20% to 80% of a total length thereof.

Also, the positive electrode tab and the negative electrode tab may be immersed in the organic solvent for 30 seconds to 2 minutes.

Also, the step of removing the positive electrode insulating layer and the negative electrode insulating layer may further include a step of drying the organic solvent after the step of immersing the positive electrode tab and the negative electrode tab in the organic solvent.

Also, the step of removing the positive electrode insulating layer and the negative electrode insulating layer may include a step of injecting the organic solvent onto the positive electrode tab and the negative electrode tab.

An electrode assembly according to an embodiment of the present invention for solving the above problems includes: a positive electrode coated with a positive electrode active material on at least a portion of a positive electrode collector; a negative electrode coated with a negative electrode active material on at least a portion of the negative electrode collector; and a separator interposed between the positive electrode and the negative electrode, wherein the positive electrode collector is formed by sequentially stacking a first positive electrode foil, a positive electrode insulating layer, and a second positive electrode foil, the negative electrode collector is formed by sequentially stacking a first negative electrode foil, a negative electrode insulating layer, and a second negative electrode foil, the positive electrode insulating layer is removed from at least partial area of a positive electrode tab that is not coated with the positive electrode active material in the positive electrode collector, and the negative electrode insulating layer is removed from at least partial area of a negative electrode tab that is not coated with the negative electrode active material in the negative electrode collector.

Also, the positive electrode insulating layer may be removed from the positive electrode tab by 20% to 80% of a total length of the positive electrode tab, and the negative electrode insulating layer may be removed from the negative electrode tab by 20% to 80% of a total length of the negative electrode tab.

Also, each of the positive electrode insulating layer and the negative electrode insulating layer may include PET.

Particularities of other embodiments are included in the detailed description and drawings.

Advantageous Effects

According to the embodiments of the present invention, there are at least the following effects.

The electrode collector may be formed in the multilayered structure including the electrode insulating layer, and the electrode insulating layers of the plurality of electrode tabs may be etched using the organic solvent to electrically connect all of the plurality of electrode tabs to each other by allowing the adjacent electrode tabs to contact each other, thereby easily connecting the one electrode lead to the plurality of electrode tabs.

The effects of the prevent invention are not limited by the aforementioned description, and thus, more varied effects are involved in this specification.

MODE FOR CARRYING OUT THE INVENTION

Figure 1:
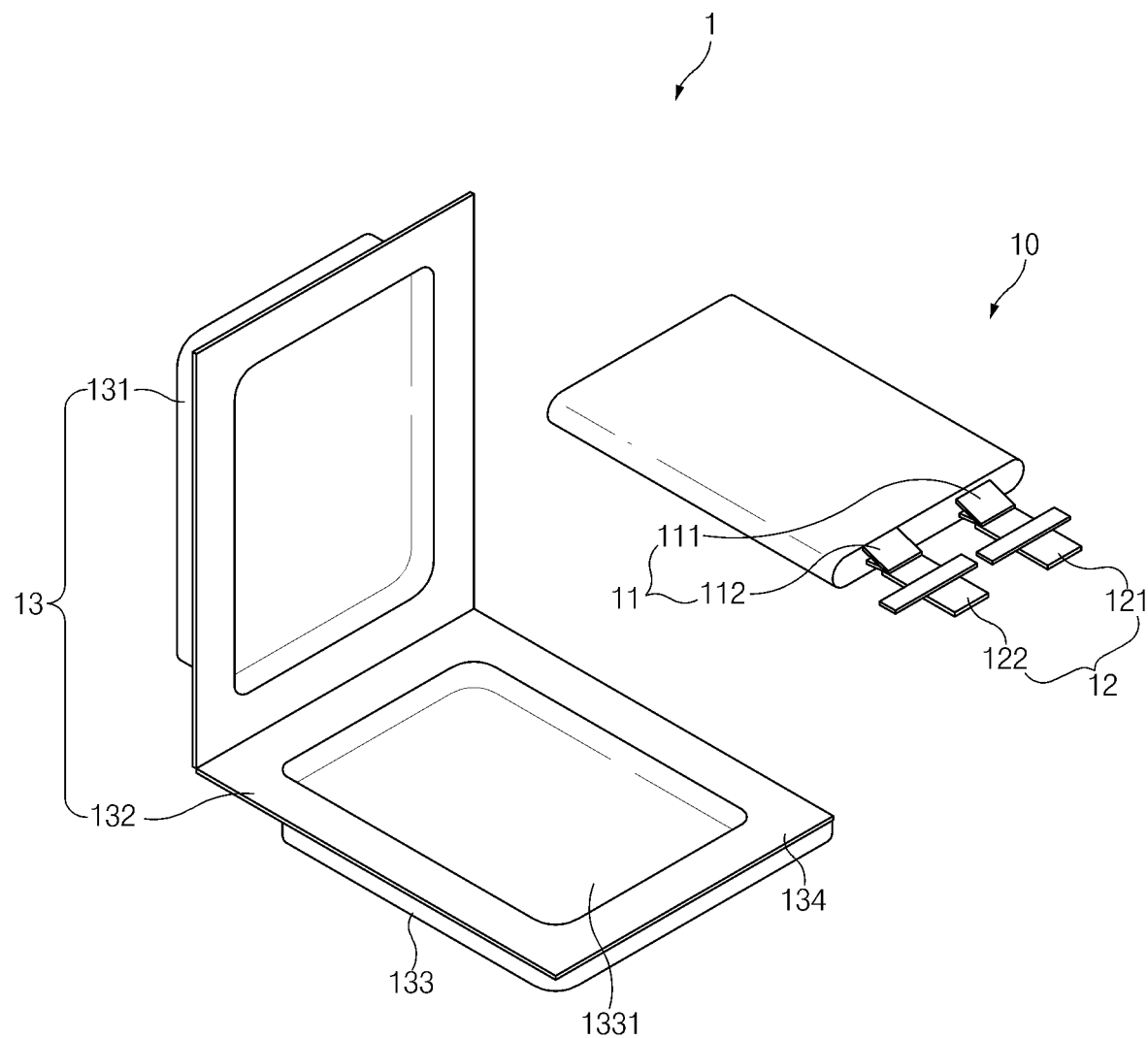
FIG. 1 is a perspective view of a pouch type secondary battery according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

FIG. 1 is an assembled view of a pouch type secondary battery 1 according to an embodiment of the present invention.

In a process of manufacturing a pouch type secondary battery 1, first, slurry in which an electrode active material, a binder, and a plasticizer are mixed with each other is applied to a positive electrode collector 101 and a negative electrode collector 102 to manufacture electrodes such as a positive electrode and a negative electrode. Thereafter, the positive electrode collector 101 and the negative electrode collector 102 are respectively stacked on both sides of a separator to form an electrode assembly 10 having a predetermined shape, and then, the electrode assembly 10 is inserted into a battery case 13, an electrolyte is injected, and sealing is performed.

The electrode assembly 10 is formed by stacking the electrodes and the separator. Particularly, the electrode assembly 10 includes two types of electrodes, such as the positive electrode and the negative electrode, and the separator interposed between the electrodes to insulate the electrodes from each other. The electrode assembly 10 may be a stack type, a jelly roll type, a stacked and folding type, or the like. Each of the two types of electrodes, i.e., the positive electrode and the negative electrode, has a structure in which active material slurry is applied to each of the electrode collectors 101 and 102, each of which has a multilayered structure, including the electrode insulating layers 1013 and 1023. The electrode collectors 101 and 102 according to an embodiment of the present invention are formed in a multilayered structure in which each of the electrode insulating layers 1013 and 1023 is stacked between two electrode foils. A detailed description of the electrode collectors 101 and 102 will be described later. The slurry may be usually formed by agitating a granular active material, an auxiliary conductor, a binder, and a plasticizer with a solvent added. The solvent may be removed in the subsequent process.

As illustrated in FIG. 1, the electrode assembly 10 includes the electrode tabs 11. The electrode tab 11 protrudes from each of the positive electrode and the negative electrode of the electrode assembly 10 to provide a path, through which electrons move, between the inside and outside of the electrode assembly 10. Each of the electrode collectors 101 and 102 of the electrode assembly 10 is constituted by a portion coated with an electrode active material and a distal end portion that is not coated with the electrode active material, i.e., a non-coating portion. Also, each of the electrode tabs 11 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 that supplies electricity to the outside of the secondary battery 1 is connected to the electrode tab 11 through spot welding. Also, a portion of the electrode lead 12 is surrounded by an insulating part 14. An insulating part 14 may be disposed to be limited within a sealing part 134, at which an upper case 131 and a lower case 132 are thermally fused, so as to be bonded to the battery case 13. Also, electricity generated from the electrode assembly 10 may be prevented from flowing to the battery case 13 through the electrode lead 12, and the sealing of the battery case 13 may be maintained. Thus, the insulating part 14 may be made of a nonconductor having non-conductivity, which is not electrically conductive. In general, although an insulation tape which is easily attached to the electrode lead 12 and has a relatively thin thickness is mainly used as the insulating part 14, the present invention is not limited thereto. For example, various members may be used as the insulating part 14 as long as the members are capable of insulating the electrode lead 12.

The electrode lead 12 includes a positive electrode lead 121 having one end connected to a positive electrode tab 111 to extend in a direction in which the positive electrode tab 111 protrudes and a negative electrode lead 122 having one end connected to a negative electrode tab 112 to extend in a direction in which the negative electrode tab 112 protrudes. On the other hand, as illustrated in FIG. 1, all of the other ends of the positive electrode lead 121 and the negative electrode lead 122 protrude to the outside of the battery case 13. As a result, electricity generated in the electrode assembly 10 may be supplied to the outside. Also, since each of the positive electrode tab 111 and the negative electrode tab 112 is formed to protrude in various directions, each of the positive electrode lead 121 and the negative electrode lead 122 may extend in various directions.

The positive electrode lead 121 and the negative electrode lead 122 may be made of materials different from each other. That is, the positive electrode lead 121 may be made of the same material as the positive electrode foil of the positive electrode collector 101, i.e., an aluminum (Al) material, and the negative electrode lead 122 may be made of the same material as the negative electrode foil of the negative electrode collector 102, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material, which accommodates the electrode assembly 10 therein. Hereinafter, the case in which the battery case 13 is the pouch will be described. The battery case 13 accommodates the electrode assembly 10 so that a portion of the electrode lead 12, i.e., the terminal part is exposed and then is sealed. As illustrated in FIG. 1, the battery case 13 includes the upper case 131 and the lower case 132. An accommodation space 1331 in which a cup part 133 is formed to accommodate the electrode assembly 10 may be provided in the lower case 132, and upper case 131 may cover an upper side of the accommodation space 1331 so that the electrode assembly 10 is not separated to the outside of the battery case 13. Here, as illustrated in FIG. 1, the cup part 133 having the accommodation space 1331 may be formed in the upper case 131 to accommodate the electrode assembly 10 in the upper portion. As illustrated in FIG. 1, one side of the upper case 131 and one side of the lower case 132 may be connected to each other. However, the present invention is not limited thereto. For example, the upper case 131 and the lower case 132 may be separately manufactured to be separated from each other.

When an electrode lead 12 is connected to the electrode tab 11 of the electrode assembly 10, and the insulating part 14 is provided on a portion of the electrode lead 12, the electrode assembly 10 may be accommodated in the accommodation space 1331 provided in the cup part 133 of the lower case 132, and the upper case 131 may cover the accommodation space from the upper side. Also, the electrolyte is injected, and the sealing part 134 extending outward from edges of the upper case 131 and the lower case 132 is sealed. The electrolyte may move lithium ions generated by electrochemical reaction of the electrode during charging and discharging of the secondary battery 1. The electrolyte may include a non-aqueous organic electrolyte that is a mixture of a lithium salt and a kind of high-purity organic solvent 2 or a polymer using a polymer electrolyte. The pouch type secondary battery 1 may be manufactured through the above-described method.

Figure 2:
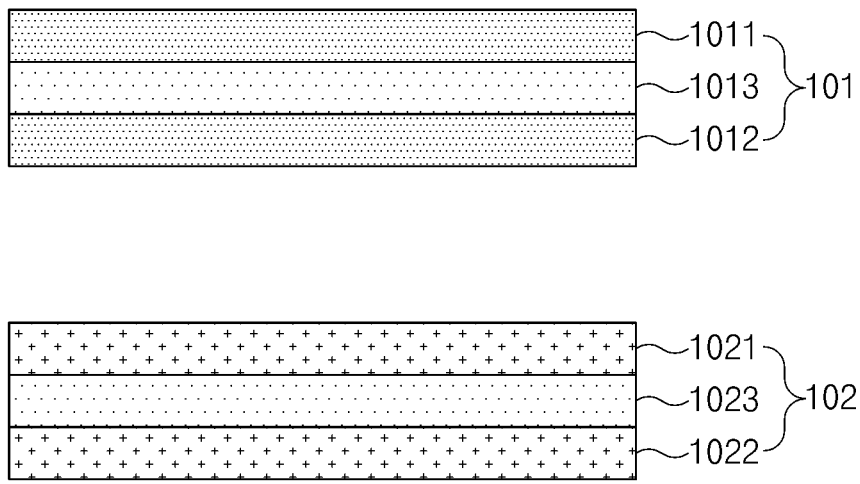
FIG. 2 is a schematic side view of electrode collectors according to an embodiment of the present invention.

FIG. 2 is a schematic side view of the electrode collector according to an embodiment of the present invention.

As described above, the electrodes such as the positive electrode and the negative electrode are manufactured by applying slurry obtained by mixing an electrode active material, a binder, and a plasticizer to the electrode collectors 101 and 102 such as the positive electrode collector 101 and the negative electrode collector 102, respectively.

According to the related art, the positive electrode collector 101 and the negative electrode collector 102 are formed in a single-layered structure. Thus, when the electrode assembly 10 is damaged due to an external impact, there is a problem in that a risk of explosion due to a short circuit occurs. However, according to an embodiment of the present invention, as illustrated in FIG. 2, the electrode collectors 101 and 102 are formed in a multilayered structure in which the electrode insulating layers 1013 and 1023 are stacked between the two electrode foils. Particularly, the positive electrode collector 101 is formed by sequentially stacking a first positive electrode foil 1011, a positive electrode insulating layer 1013, and a second positive electrode foil 1012. Also, the negative electrode collector 102 is formed by sequentially stacking a first negative electrode foil 1021, a negative electrode insulating layer 1023, and a second negative electrode foil 1022.

Each of the first and second positive electrode foils 1011 and 1012 is made of a material having high conductivity without causing a chemical change. For example, the material may be stainless steel, aluminum, nickel, titanium, calcined carbon, aluminum, or a material in which carbon, nickel, titanium, silver, or the like is surface-treated on a surface of stainless steel, but is not limited thereto. Also, each of the first and second positive electrode foils 1011 and 1012 may have fine unevennesses on a surface thereof to improve bonding force of the positive electrode active material.

Each of the first and second negative electrode foils 1021 and 1022 is made of a material having conductivity without causing a chemical change. For example, the material may be copper, stainless steel, nickel, titanium, calcined carbon, copper, a material in which carbon, nickel, titanium, silver, or the like is surface-treated on a surface of stainless steel, or an aluminum-cadmium alloy, in particular, preferably be copper that is plated with nickel, but is not limited thereto. Also, each of the first and second negative electrode foils 1021 and 1022 may have fine unevennesses on a surface thereof to improve bonding force of the negative electrode active material.

The positive electrode insulating layer 1013 is stacked between the first positive electrode foil 1011 and the second positive electrode foil 1012 to insulate the first positive electrode foil 1011 and the second positive electrode foil 1012 from each other. Also, the negative electrode insulating layer 1023 is stacked between the first negative electrode foil 1021 and the second negative electrode foil 1022 to insulate the first negative electrode foil 1021 and the second negative electrode foil 1022 from each other. As a result, even if the electrode assembly 10 is damaged due to the external impact, one surface and the other surface of one electrode may be electrically disconnected from each other to prevent the risk of explosion due to the short circuit from occurring, thereby securing safety. Each of the positive electrode insulating layer 1013 and the negative electrode insulating layer 1023 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polymer such as a nylon resin or polyethylene terephthalate (PET) having mainly abrasion resistance and heat resistance is used.

Figure 3:
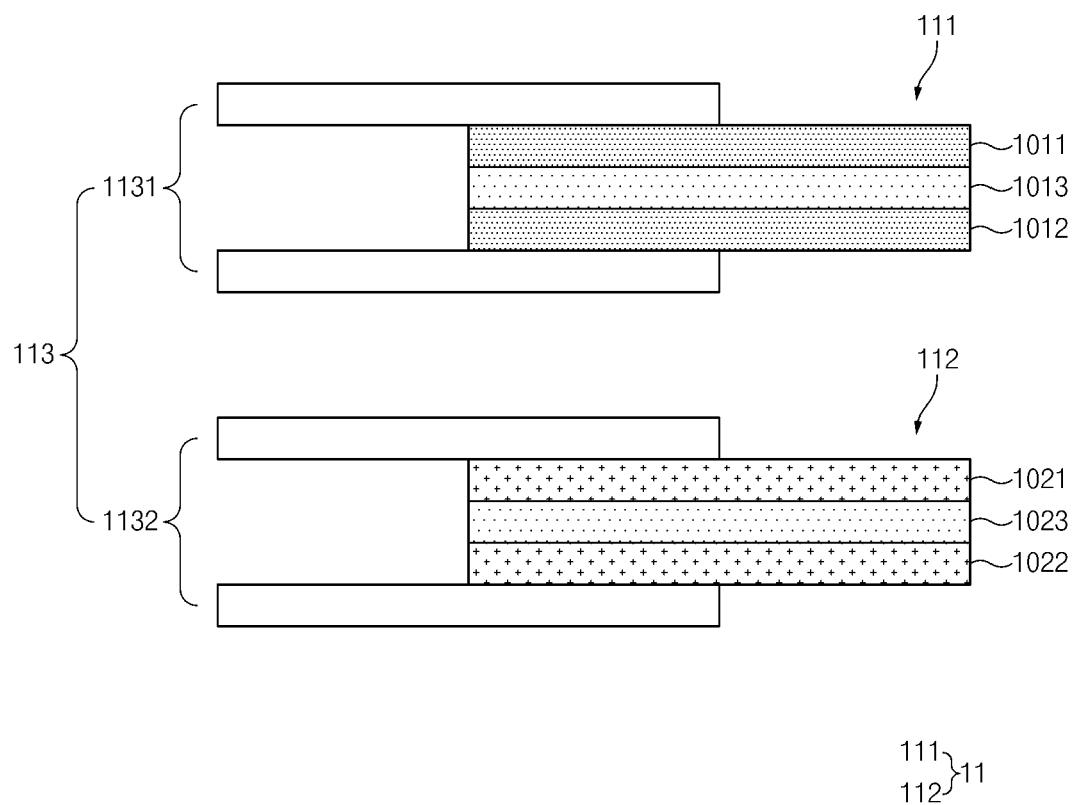
FIG. 3 is a schematic side view illustrating a connection part of a positive electrode foil and a negative electrode foil of an electrode tab.
Figure 4:
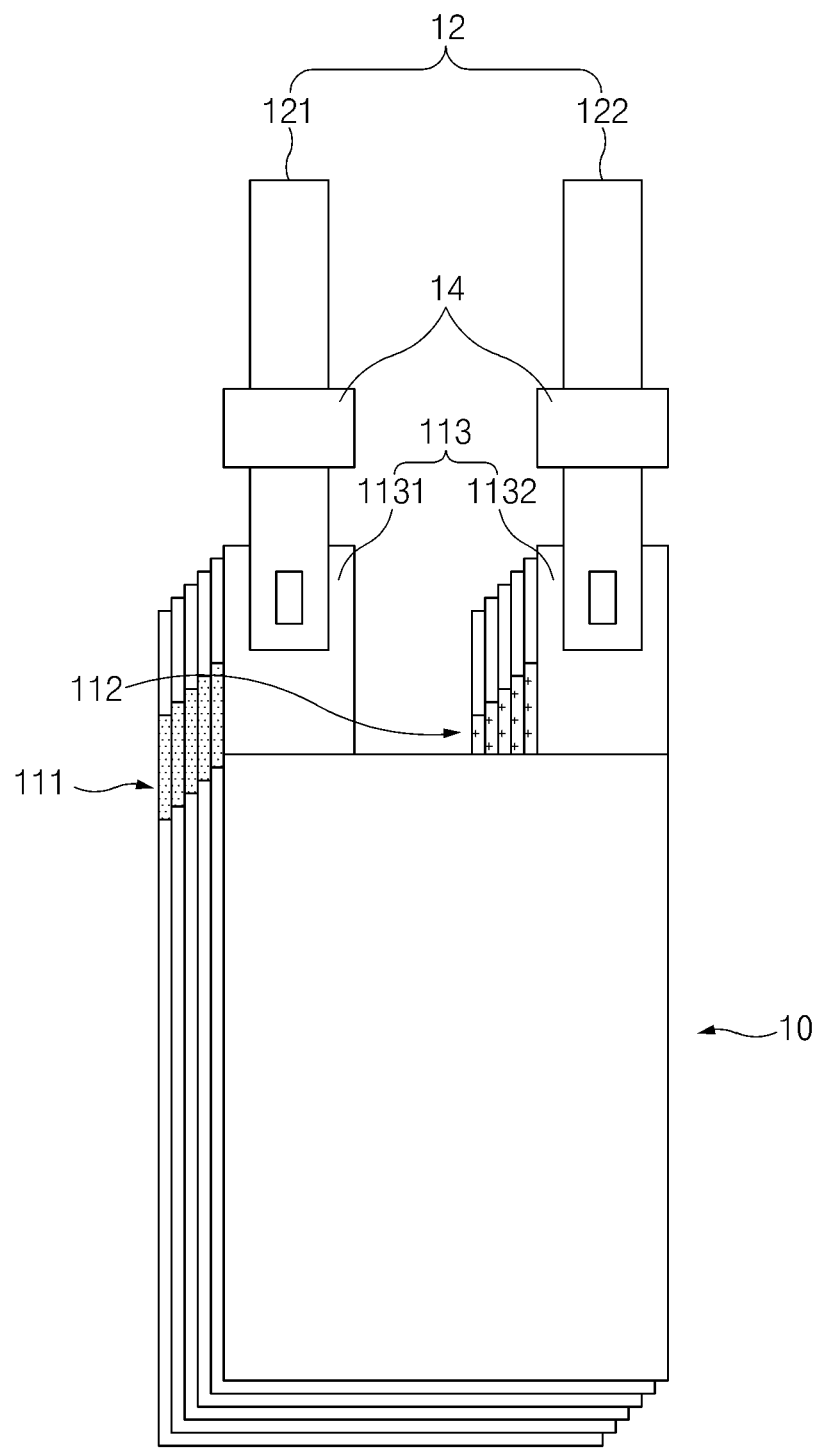
FIG. 4 is a schematic top view illustrating an electrode lead connected to the connection part.

FIG. 3 is a schematic side view illustrating a configuration in which a connection part 113 is formed on each of the positive electrode foil and the negative electrode foil of the electrode tab 11, and FIG. 4 is a schematic top view illustrating a configuration in which the electrode lead is connected to the connection part.

As described above, the electrode tab 11 may be formed by cutting the non-coating portion from each of the electrode collectors 101 and 102 or by connecting a separate conductive member to the non-coating portion by ultrasonic welding or the like. Also, the electrode lead 12 has one end connected to the electrode tab 11, and the electrode tab 11 extends in a protruding direction so that the other end thereof protrudes to the outside of the battery case 13. Hereinafter, the electrode tab 11 is described as being formed by only cutting the non-coating portion, but this is for convenience of description and thus is not intended to limit the scope of rights.

If the electrode collectors 101 and 102 are formed in a single-layered structure, all of the plurality of electrode tabs 11 are electrically connected by contacting and connecting the electrode tabs 11 adjacent to each other. Therefore, even if one electrode lead 12 is connected to only one electrode tab 11, the whole of the electricity generated inside the electrode assembly 10 through the electrode lead 12 may be sufficiently supplied to the outside of the secondary battery 1.

However, according to an embodiment of the present invention, since the electrode collectors 101 and 102 are formed in a multi-layered structure including the electrode insulating layers 1013 and 1023, even if the electrode tabs 11 adjacent to each other are connected to be in contact with each other, all of the plurality of electrode tabs 11 are not electrically connected. Thus, the plurality of connection parts 113 that connect all of the plurality of electrode tabs 11 to each other and also connect to one electrode lead 12 have to be separately formed.

As illustrated in FIG. 3, the plurality of connection parts 113 includes a positive electrode connection part 1131 connected to each of the plurality of first and second positive electrode foils 1011 and 1012 and a negative electrode connection part connected to each of the plurality of first and second negative electrode foils 1021 and 1022. Also, as illustrated in FIG. 4, the plurality of positive electrode connection parts 1131 adjacent to each other are connected to be in contact with each other so that one positive electrode lead 121 is connected to one positive electrode connection part 1131. Likewise, the plurality of negative electrode connection parts 1132 adjacent to each other are connected to be in contact with each other so that one negative electrode lead 122 is connected to one negative electrode connection part 1132. As a result, the whole of the electricity generated inside the electrode assembly 10 may be sufficiently supplied to the outside of the secondary battery 1 through one positive electrode lead 121 and one negative electrode lead 122.

However, in this method, the plurality of connection parts 113 are separately required, and the processes of respectively connecting the plurality of connection parts 113 to the first and second positive electrode foils 1011 and 1012 and the first and second negative electrode foils 1021 and 1022 are separately required. As a result, there is a problem in that manufacturing cost and time are excessively consumed.

Figure 5:
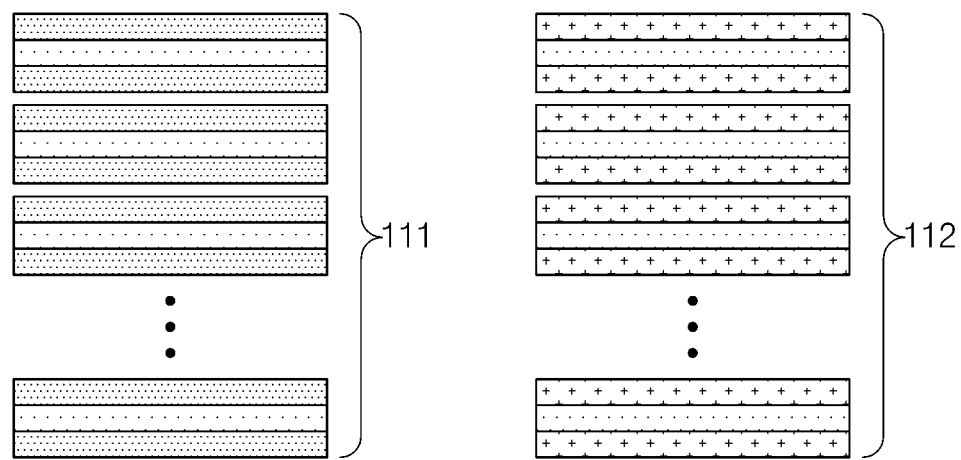
FIG. 5 is a schematic front view illustrating a plurality of positive stacked electrode tabs and a plurality of stacked negative electrode tabs according to an embodiment of the present invention.

FIG. 5 is a schematic front view illustrating a configuration in which the plurality of positive electrode tabs and the plurality of negative electrode tabs are stacked according to an embodiment of the present invention.

According to an embodiment of the present invention, the electrode collectors 101 and 102 are formed in the multi-layered structure including the electrode insulating layers 1013 and 1023, and the electrode insulating layers 1013 and 1023 of the plurality of electrode tabs 11 are etched using the organic solvent 2. Thus, since the electrode tabs 11 adjacent to each other are in contact with each other to electrically connect all of the plurality of electrode tabs 11, one electrode lead 12 may be easily connected to the plurality of electrode tabs 11.

For this, a method for manufacturing an electrode assembly 10 according to an embodiment of the present invention includes: a step of applying a positive electrode active material to at least a portion of a positive electrode collector 101, which is formed by sequentially stacking a first positive electrode foil 1011, a positive electrode insulating layer 1013, and a second positive electrode foil 1012, to manufacture a positive electrode and applying a negative electrode active material to at least a portion of a negative electrode collector 102, which is formed by sequentially stacking a first negative electrode foil 1021, a negative electrode insulating layer 1023, and a second negative electrode foil 1022, to manufacture a negative electrode; a step of interposing a separator between the positive electrode and the negative electrode; a step of respectively removing the positive electrode insulating layer 1013 and the negative electrode insulating layer 1023 from at least partial areas of a positive electrode tab 111, which is not coated with the positive electrode active material in the positive electrode collector 101, and an negative electrode tab 112, which is not coated with the negative electrode active material in the negative electrode collector 102; and a step of connecting a positive electrode lead 121 and a negative electrode lead 122 to the positive electrode tab 111 and the negative electrode tab 112, respectively. In addition, the step of removing the positive electrode insulating layer 1013 and the negative electrode insulating layer 1023 may include a step of immersing the positive electrode tab 111 and the negative electrode tab 112 in an organic solvent 2.

In addition, the electrode assembly 10 manufactured through the above-described method according to an embodiment of the present invention includes: a positive electrode coated with a positive electrode active material on at least a portion of a positive electrode collector 101; a negative electrode coated with a negative electrode active material on at least a portion of a negative electrode collector 102; and a separator interposed between the positive electrode and the negative electrode. The positive electrode collector 101 is formed by sequentially stacking a first positive electrode foil 1011, a positive electrode insulating layer 1013, and a second positive electrode foil 1012, and the negative electrode collector 102 is formed by sequentially stacking a first negative electrode foil 1021, a negative electrode insulating layer 1023, and a second negative electrode foil 1022. The positive electrode insulating layer 1013 is removed from at least partial area of a positive electrode tab 111 that is not coated with the positive electrode active material in the positive electrode collector 101, and the negative electrode insulating layer 1023 is removed from at least partial area of a negative electrode tab 112 that is not coated with the negative electrode active material in the negative electrode collector 102.

As illustrated in FIG. 5, when the separator is interposed between the positive electrode and the negative electrode, an electrode stack is formed, and each of the plurality of positive electrode tabs 111 and each of the plurality of negative electrode tabs 112 are stacked. Also, the plurality of positive electrode insulating layers 1013 and the plurality of negative electrode insulating layers 1023 are inserted into the plurality of positive electrode tabs 111 and negative electrode tabs 112, respectively.

Figure 6:
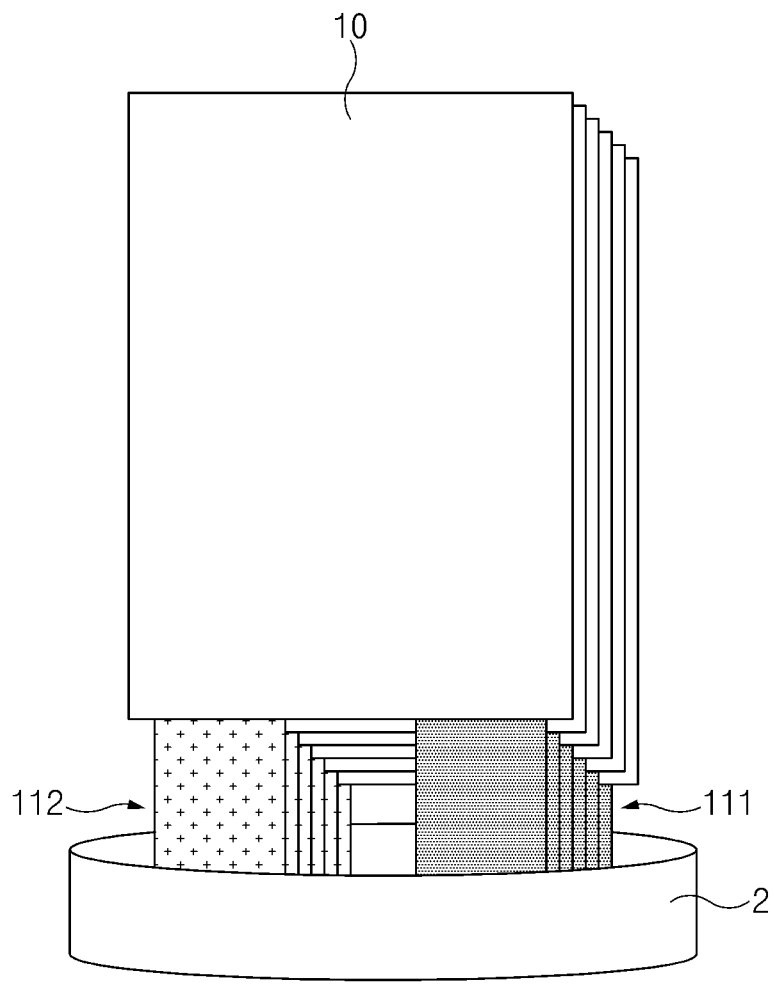
FIG. 6 is a schematic view illustrating the plurality of positive electrode tabs and the plurality of negative electrode tabs immersed in an organic solvent according to an embodiment of the present invention.
Figure 7:
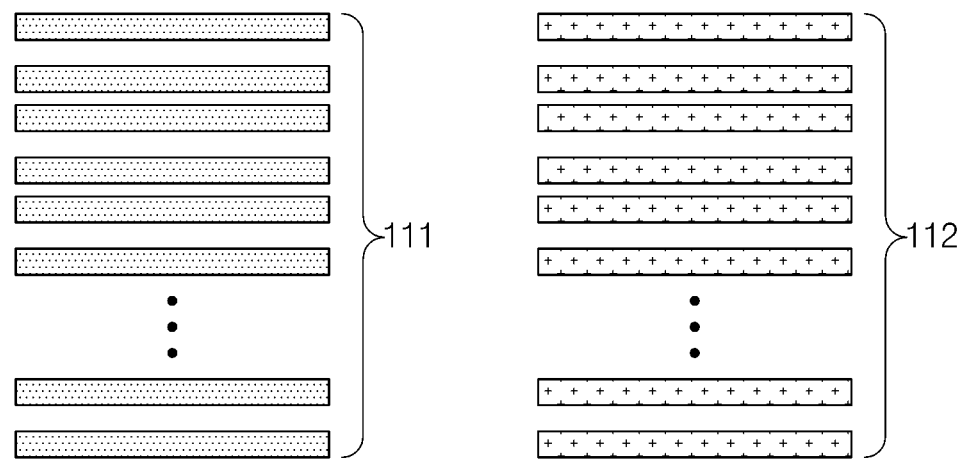
FIG. 7 is a schematic front view illustrating a positive electrode insulating layer and a negative electrode insulating layer removal according to an embodiment of the present invention.

FIG. 6 is a schematic view illustrating a state in which the plurality of positive electrode tabs and the plurality of negative electrode tabs are immersed in the organic solvent according to an embodiment of the present invention, and FIG. 7 is a schematic front view illustrating a configuration in which the positive electrode insulating layer and the negative electrode insulating layer are removed from the plurality of positive electrode tabs and the negative electrode tabs, respectively, according to an embodiment of the present invention.

The electrode insulating layers 1013 and 1023 of the plurality of electrode tabs 11 are etched using the organic solvent 2. Particularly, according to an embodiment of the present invention, the positive electrode tab 111 and the negative electrode tab 112 of the formed electrode stack are immersed in the organic solvent 2 as illustrated in FIG. 6.

As described above, the positive electrode insulating layer 1013 and the negative electrode insulating layer 1023 may be made of various types of polymers, and in particular, may include polyethylene terephthalate (PET). Also, each of the first positive electrode foil 1011, the second positive electrode foil 1012, the first negative electrode foil 1021, and the second negative electrode foil 1022 may be made of a metal. In this case, the organic solvent 2 preferably has no or low chemical reactivity with the metal and high chemical reactivity with the polymer and may include, for example, acetone. Thus, the organic solvent 2 does not change the first positive electrode foil 1011, the second positive electrode foil 1012, the first negative electrode foil 1021 and the second negative electrode foil 1022, each of which is made of the metal, and as illustrated in FIG. 7, only the positive electrode insulating layer 1013 and the negative electrode insulating layer 1023, each of which is made of the polymer, are etched.

The positive electrode insulating layer 1013 and the negative electrode insulating layer 1023 may be removed from the at least partial areas of the positive electrode tab 111 and the negative electrode tab 112, respectively. That is, the positive electrode insulating layer 1013 and the negative electrode insulating layer 1023 may be removed from the entire area of the positive electrode tab 111 and the negative electrode tab 112, but may be removed from only partial areas. For this, each of the positive electrode tab 111 and the negative electrode tab 112 may be partially immersed in the organic solvent 2, in particular, by 20% to 80% of a total length thereof, preferably, may be immersed by 30% to 70%.

Since the organic solvent 2 is a material having high chemical reactivity, if the positive electrode tab 111 and the negative electrode tab 112 are immersed for a long time, the organic solvent 2 may chemically react with the first positive electrode foil 1011, the second positive electrode foil 1012, and the first negative electrode foil 1021, each of which is made of the metal. Thus, the positive electrode tab 111 and the negative electrode tab 112 may be immersed in the organic solvent 2 for 30 seconds to 2 minutes, preferably 1 minute to 2 minutes.

According to another embodiment of the present invention, the organic solvent 2 may be injected onto the positive electrode tab 111 and the negative electrode tab 112 of the formed electrode stack by using a nozzle or the like. Thus, when compared to a case in which the positive electrode tab 111 and the negative electrode tab 112 are simply immersed in the organic solvent 2, the electrode insulating layers 1013 and 1023 may be etched more quickly and easily through a pressure of the organic solvent 2 itself.

Figure 8:
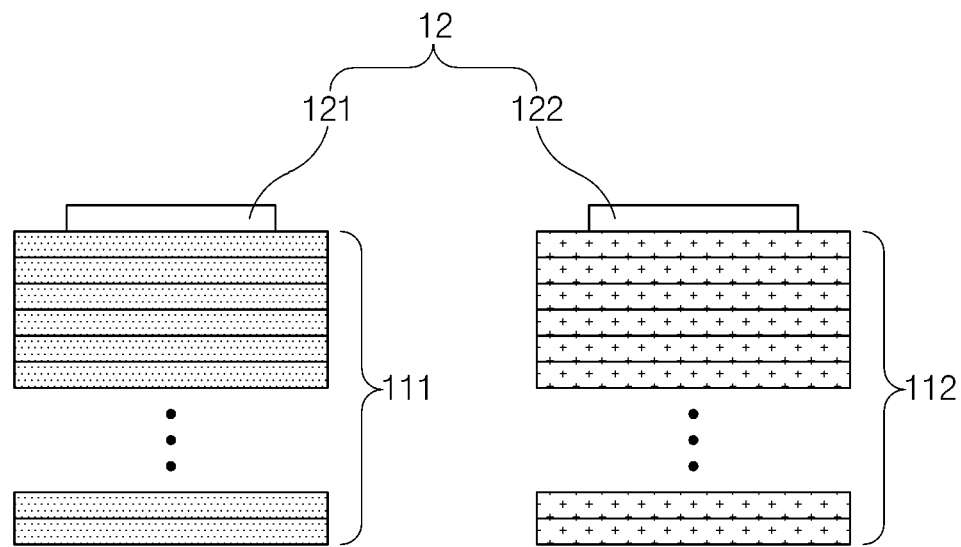
FIG. 8 is a schematic front view illustrating an electrode lead connected to each of the plurality of positive electrode tabs and the plurality of negative electrode tabs according to an embodiment of the present invention.
Figure 9:
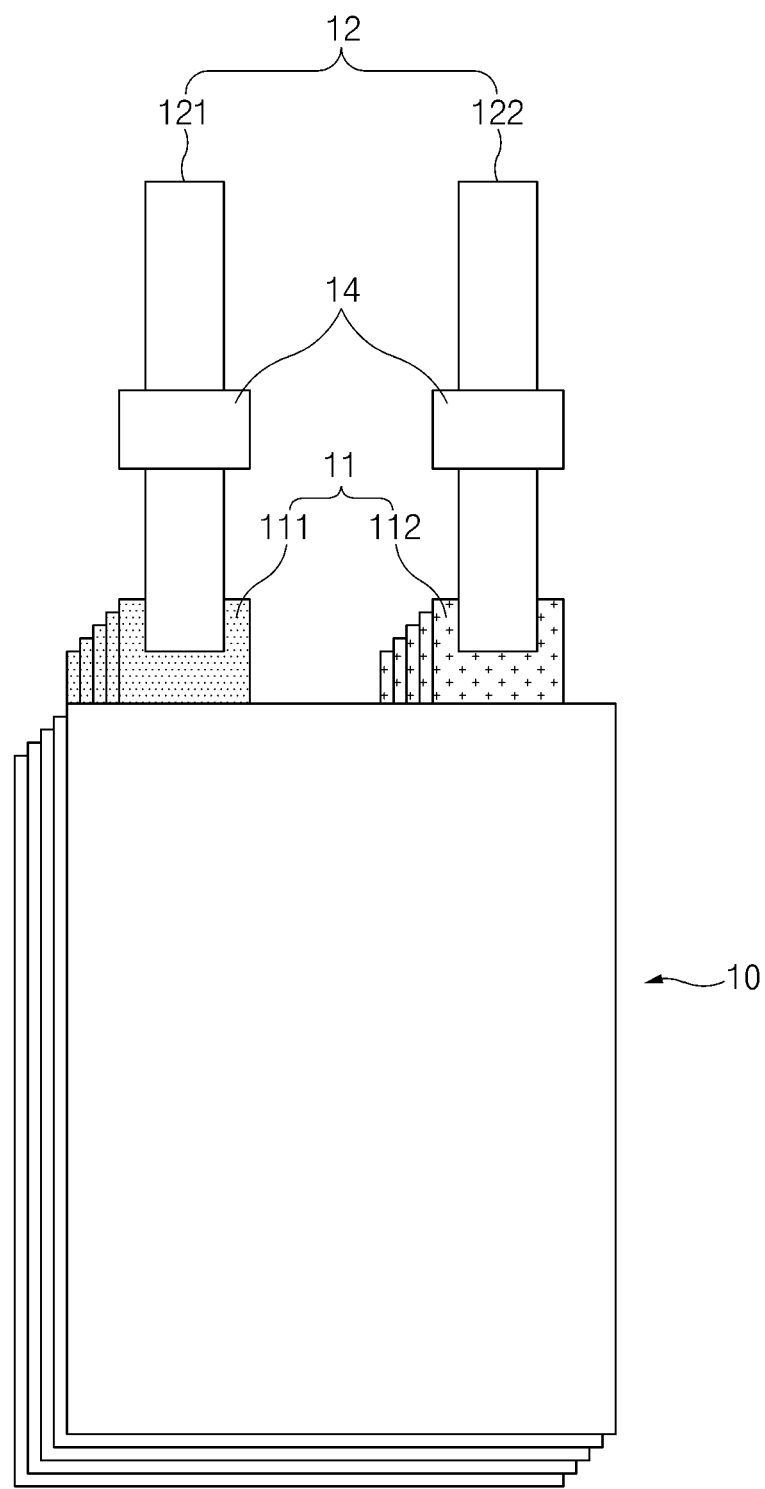
FIG. 9 is a schematic top view illustrating the electrode lead connected to each of the plurality of positive electrode tabs and the plurality of negative electrode tabs according to an embodiment of the present invention.

FIG. 8 is a schematic front view illustrating a configuration in which the electrode lead is connected to each of the plurality of positive electrode tabs and the plurality of negative electrode tabs according to an embodiment of the present invention, and FIG. 9 is a schematic top view illustrating a configuration in which the electrode lead is connected to each of the plurality of positive electrode tabs and the plurality of negative electrode tabs according to an embodiment of the present invention.

After immersing the positive electrode tab 111 and the negative electrode tab 112 in the organic solvent 2, the organic solvent 2 is dried. Therefore, only the positive electrode insulating layer 1013 and the negative electrode insulating layer 1023 may be removed from the electrode tab 11.

Since the positive electrode insulating layer 1013 and the negative electrode insulating layer 1023 are removed from the electrode tab 11, an empty space is formed between the first positive electrode foils 1011 and the second positive electrode foils 1012, and also, an empty space is formed between the first negative electrode foil 1021 and the second negative electrode foils 1022. As a result, as illustrated in FIG. 8, the positive electrode foils adjacent to each other may be in contact with each other so as to be electrically connected to each other, and the negative electrode foils adjacent to each other may be in contact with each other so as to be electrically connected to each other.

In addition, as illustrated in FIGS. 8 and 9, one positive electrode lead 121 is connected to one positive foil, and one negative electrode lead 122 is connected to one negative electrode foil. Therefore, even if one electrode lead 12 is connected to only one electrode tab 11, the whole of the electricity generated inside the electrode assembly 10 through the electrode lead 12 may be sufficiently supplied to the outside of the secondary battery 1.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for manufacturing an electrode assembly, the method comprising the steps of:
  applying a positive electrode active material to at least a portion of a positive electrode collector of a positive electrode, the positive electrode collector being formed by sequentially stacking a first positive electrode foil, a positive electrode insulating layer, and a second positive electrode foil to provide a positive electrode including a positive electrode tab not coated with the positive electrode active material,
  applying a negative electrode active material to at least a portion of a negative electrode collector of a negative electrode, the negative electrode collector being formed by sequentially stacking a first negative electrode foil, a negative electrode insulating layer, and a second negative electrode foil, to provide a negative electrode with a negative electrode tab not coated with the negative electrode active material;
  interposing a separator between the positive electrode and the negative electrode;
  removing the positive electrode insulating layer from at least partial areas of the positive electrode tab not coated with the positive electrode active material;
  removing the negative electrode insulating layer from at least partial areas of the negative electrode tab not coated with the negative electrode active material; and
  connecting a positive electrode lead to the positive electrode tab and a negative electrode lead to the negative electrode tab.

2. The method of claim 1, wherein the steps of removing the positive electrode insulating layer and the negative electrode insulating layer include steps of immersing the positive electrode tab and the negative electrode tab in an organic solvent.

3. The method of claim 2, wherein each of the positive electrode insulating layer and the negative electrode insulating layer comprises polyethylene terephthalate (PET).

4. The method of claim 3, wherein the organic solvent comprises acetone.

5. The method of claim 2, wherein each of the positive electrode tab and the negative electrode tab is immersed in the organic solvent by 20% to 80% of a total length thereof.

6. The method of claim 2, wherein the positive electrode tab and the negative electrode tab are immersed in the organic solvent for 30 seconds to 2 minutes.

7. The method of claim 2, wherein the steps of removing the positive electrode insulating layer and the negative electrode insulating layer further comprise steps of drying the organic solvent after the step of immersing the positive electrode tab and the negative electrode tab in the organic solvent.

8. The method of claim 1, wherein the steps of removing the positive electrode insulating layer and the negative electrode insulating layer comprise steps of injecting an organic solvent onto the positive electrode tab and the negative electrode tab.

* * * * *